(12) United States Patent
Breithaupt et al.

(10) Patent No.: US 11,345,308 B2
(45) Date of Patent: May 31, 2022

(54) EJECTOR CLUTCH AND BELT TENSIONER

(71) Applicants: IMS GEAR SE & Co. KGaA, Donaueschingen (DE); AUTOLIV DEVELOPMENT AB, Vårgårda (SE)

(72) Inventors: Sebastian Breithaupt, Villingen-Schwenningen (DE); Eric Dreher, Vårgårda (SE); Andreas Lucht, Vårgårda (SE)

(73) Assignees: IMS GEAR SE & CO. KGAA, Donaueschingen (DE); AUTOLIV DEVELOPMENT AS, Vargarda (SE)

( * ) Notice: Subject to any disclaimer, the term of this patent is extended or adjusted under 35 U.S.C. 154(b) by 0 days.

(21) Appl. No.: 16/913,287

(22) Filed: Jun. 26, 2020

(65) Prior Publication Data
US 2020/0406857 A1    Dec. 31, 2020

(30) Foreign Application Priority Data

Jun. 27, 2019    (EP) .................................... 19182929

(51) Int. Cl.
*B60R 22/46*    (2006.01)
*F16D 15/00*    (2006.01)
*F16D 43/202*    (2006.01)

(52) U.S. Cl.
CPC .............. *B60R 22/46* (2013.01); *F16D 15/00* (2013.01); *F16D 43/2026* (2013.01); *B60R 2022/468* (2013.01)

(58) Field of Classification Search
CPC . B60R 22/46; B60R 2022/468; B60R 22/195; B60R 22/1958; B60R 2022/1957;
(Continued)

(56) References Cited

U.S. PATENT DOCUMENTS 2,128,715 A * 8/1938 Reich ..................... G09F 11/295
74/378
4,392,840 A * 7/1983 Radocaj ................ F16H 7/1272
474/117
(Continued)

FOREIGN PATENT DOCUMENTS

DE       102014118700 A1    6/2016
WO       2012/154911 A1    11/2012
WO       WO-2018002008 A1 *  1/2018    ........... F16D 43/206

OTHER PUBLICATIONS

European Search Report dated Jan. 23, 2020 in corresponding application No. 19182929.0.

*Primary Examiner* — Richard M Lorence
(74) *Attorney, Agent, or Firm* — Nath, Goldberg & Meyer; Jerald L. Meyer (57) ABSTRACT

The present invention relates to an ejector clutch (1) for a belt tensioner, comprising a first shaft (10), a second shaft (20), and a coupling part (30), wherein the coupling part (30) is arranged between the first shaft (10) and the second shaft (20) in a longitudinal axis (X) defining an axial direction, wherein the coupling part (30) has at least one clutch finger (40), which engages in a first recess (15) of the first shaft (10) for transmitting a torque (M) and, when a torque (M2) to be transmitted is exceeded, said clutch finger is displaced, against a spring force in the axial direction, from the first recess (15) of the first shaft (10) into a second recess (25) of the second shaft (20). The invention further relates to a belt tensioner with an ejector clutch (1).

20 Claims, 6 Drawing Sheets

(58) Field of Classification Search
CPC ..... B60R 2022/4666; B60R 2022/4685; F16D 15/00; F16D 41/12; F16D 7/046; F16D 43/2026; F16H 3/006; F16H 2200/0034; Y10T 74/19274
USPC ............... 192/45.1, 48.91, 54.5, 56.61, 69.1; 464/38
See application file for complete search history.

(56) References Cited

U.S. PATENT DOCUMENTS

| | | | | |
|---|---|---|---|---|
| 6,443,380 | B1* | 9/2002 | Biller | B60R 22/46 242/374 |
| 6,681,949 | B2* | 1/2004 | Tibor | B65D 39/088 220/288 |
| 6,857,594 | B2 | 2/2005 | Mori et al. | |
| 7,341,216 | B2* | 3/2008 | Heckmayr | B60R 22/44 242/374 |
| 7,584,936 | B2* | 9/2009 | Lewis | F16D 7/048 251/77 |
| 7,963,473 | B2* | 6/2011 | Clute | B60R 22/4676 242/374 |
| 8,657,090 | B2* | 2/2014 | Yang | F16D 43/218 192/35 |
| 2007/0051841 | A1 | 3/2007 | Mori | |
| 2013/0214080 | A1* | 8/2013 | Lee | F16D 11/00 242/374 |
| 2013/0341451 | A1 | 12/2013 | Saito et al. | |
| 2014/0318915 | A1* | 10/2014 | Nuding | B60R 22/46 192/45.1 |
| 2020/0124152 | A1* | 4/2020 | Lee | F16F 15/123 |

\* cited by examiner

EJECTOR CLUTCH AND BELT TENSIONER

FIELD

The present invention relates to an ejector clutch and a belt tensioner with the features of an ejector clutch.

BACKGROUND

Belt tensioners are known in various embodiments from the prior art and form a passive safety system in a vehicle. Belt tensioners are used to properly fasten the seat belt of a passenger after assuming the seated position in the vehicle, the seat belt being tightened in such a way that the passenger is held securely in the seated position but still enjoys sufficient freedom of movement. Belt tensioners are also used to tighten the seat belt in the event of an accident or shortly before an expected collision such that the passenger takes part in the overall deceleration of the vehicle at an earlier point. For this purpose, the seat belt is tightened quickly and with a high torque within a short time, as a result of which the seat belt is particularly tight against the passenger and the passenger fully participates in the overall deceleration.

Belt tensioners are known from the prior art which are triggered by a tensioned spring or a small explosive charge. Belt tensioners are also known from the prior art which can be triggered electromechanically and reversibly and tighten the seat belt, even in the case of hazardous situations which are detected by sensors.

A disadvantage of the previously known electromechanical belt tensioners is that they often have to be provided with a spring or a smaller explosive charge to trigger them in order to tighten the seat belt with sufficient tension within a very short time.

This is where the present invention comes in.

SUMMARY

Therefore, the object of the invention to be achieved is to propose an improved belt tensioner which expediently eliminates the disadvantages of electromechanical belt tensioners known from the prior art and, on the one hand, enables the seat belt to be tightened particularly quickly but, on the other hand, also has a sufficiently high torque in order to sufficiently tighten the seat belt against the passenger's body.

These objects are achieved by an ejector clutch, such as an ejector clutch of a belt tensioner.

The ejector clutch according to the invention for a belt tensioner comprises a first shaft, a second shaft, and a coupling part, the coupling part being arranged between the first shaft and the second shaft in a longitudinal axis defining an axial direction. According to the invention, the coupling part has at least one clutch finger, which engages in at least one first recess of the first shaft for transmitting a torque from the coupling part to the first shaft and, when a torque to be transmitted, which can be predetermined, is exceeded against a spring force in the axial direction, it is displaced from the first recess of the first shaft into at least one second recess of the second shaft and vice versa.

The invention is therefore based on the idea that the coupling part has at least one spring-movable clutch finger which engages in the at least first recess of the first shaft until a predefined torque—also hereinafter referred to as switching moment below—is reached and a torque is transferred from the coupling part to the first shaft until said switching moment is reached. When the switching moment is reached, the at least one spring movable clutch finger is displaced, in the axial direction, counter to a spring force from the at least one first recess into the at least one second recess of the second shaft, as a result of which transmission of the torque from the coupling part to the first shaft is interrupted and henceforth the torque is transmitted from the coupling part to the second shaft. As soon as the torque to be transmitted again falls below a predetermined value, the clutch finger is moved, by the spring force, from the second recess back into the first recess of the first shaft.

The torque is realized between the at least one clutch finger and the respective first or second recess of the first or the second shaft by a form fit, the at least one clutch finger engaging in the respective recess in the manner of a driver.

The predefined torque can be predefined by a corresponding design of the clutch finger, of the coupling part, and/or of the respective recess, which is described below.

An advantageous embodiment of the present invention provides that the at least one clutch finger is connected to the coupling part by a spring bar. In particular, it is preferred if the spring bar and the coupling part are formed in one piece and preferably made of spring steel. It is further preferred if the coupling part is a plate-shaped part, in particular if the coupling part is a stamped part, which is characterized in that it can be produced cost-effectively in large numbers.

A further advantageous embodiment of the present invention provides that the spring bar of the at least one clutch finger is annular or spiral and has a free end region, on which the clutch finger is arranged. The at least one clutch finger can be rigidly arranged on the free end region by suitable fastening means, the at least one clutch finger preferably being inserted in an insertion opening in the end region and being attached in the insertion opening in a form-fitting, force-fitting, and/or substance-bonded manner. In particular, it is preferred if the clutch finger is attached in the insertion opening by means of flanging and/or welding.

According to a further embodiment of the present invention, the clutch finger is arranged a distance away from the longitudinal axis and has a first end region and a second end region. The first end region can protrude from the coupling part in the longitudinal axis on the side facing the first shaft, and the second end region can protrude on the side of the coupling part facing the second shaft. The length L of the at least one clutch finger corresponds to the distance A between the first end region and the second end region, the length L corresponding to a multiple of a thickness t of the coupling part. A ratio of L>t is preferred, more preferably L≥2 t, even more preferably L≥5 t.

In addition, it is preferred if the length L of the at least one clutch finger, measured in the longitudinal axis, is greater than a distance A between the side of the first shaft facing the coupling part and the side of the second shaft facing the coupling part, i.e. L>A. This configuration ensures that the clutch finger engages in at least one of the recesses of the first shaft and/or of the second shaft at any given time and that the seat belt is tightened further when the predefined torque is reached. Idling or freewheeling is preferably not desirable.

It is preferred if the first end region projects into the first recess of the first shaft in the unloaded state of the coupling part. Here and in the following, an unloaded state of the ejector clutch is understood to mean the state when no torque is being transferred through the coupling part.

According to a further advantageous embodiment of the present invention, it is provided that the at least one clutch finger is conical or wedge-shaped. The cross-section of the clutch finger can be cylindrical, elliptical, polygonal, or any free form, the first end region preferably being a tip and the second end region being a stump, as a result of which the cross-sectional area of the first end region of the clutch finger is less than the cross-sectional area in the second end region. In particular, it is preferred if the at least one clutch finger is spherical or wedge-shaped and has an opening angle β, the opening angle β largely determining the switching moment or the predefined torque on the basis of the principle of the inclined plane. The opening angle β is preferably in a range of $5° \leq β \leq 90°$, more preferably $15° \leq β \leq 60°$.

It has also proven to be advantageous if the first recess and/or the second recess has at least one contact surface, the contact surface being designed to transmit the torque to be transmitted from the at least one clutch finger to the respective shaft. In particular, the contact surfaces and the clutch fingers are matched to one another in such a way that the clutch finger can lie as flat as possible on the contact surface of the first recess and of the second recess.

In addition, the contact surface can be designed to apply a force acting in the axial direction to the at least one clutch finger during the transmission of the torque, by means of which the at least one clutch finger is displaced from of or into the respective recess in the axial direction.

When the torque is transmitted between the coupling part and the respective shaft, an axial force results by means of the cone or wedge shape and/or by means of the contact surface of the respective recess, said force displacing the at least one clutch finger in the axial direction.

In addition, it has proven to be advantageous if the at least one contact surface is designed as a wedge surface tapering in the axial direction. Accordingly, it is preferred if the first recess, on the side of the first shaft facing the coupling part, has a tapering cross-section, as a result of which, due to the inclined plane when torque is transmitted between the contact surface and the at least one clutch finger, an axial force results, by means of which the clutch finger is pressed out of the first recess against a spring force. It is also advantageous if the second recesses have wedge surfaces tapering in the axial direction on the side of the second shaft facing the coupling part, whereby, when the switching moment is exceeded, the at least one clutch finger is pushed into the second recess to form a complete form-fitting connection.

It is advantageous if the respective recess has a second contact surface which, as viewed in the circumferential direction, is formed in the recess on the diametral side of the previously described contact surface.

The at least one contact surface can lie wholly or partially in a plane which is inclined at an angle α with respect to a plane which lies in the longitudinal axis. It is preferred if the angle α is $45° \geq α \geq 2.5°$ in relation to the plane in the longitudinal axis. The angle α also largely determines the switching moment. The smaller the angle α, the greater the switching moment.

A further preferred embodiment of the present invention provides that multiple clutch fingers are arranged around the longitudinal axis, which are preferably arranged circumferentially-symmetrically about the longitudinal axis.

In addition, it is also advantageous if the first shaft and the second shaft have multiple recesses, which are also preferably arranged circumferentially-symmetrically about the longitudinal axis. Furthermore, it has proven to be advantageous if the number of the first recesses and the second recesses in the first shaft and the second shaft corresponds to the number of clutch fingers or a multiple of the number of clutch fingers.

Furthermore, it has proven to be advantageous if the first shaft, the second shaft, and the coupling part are arranged coaxially with respect to one another on the longitudinal axis.

According to a further embodiment of the present invention, the first shaft and/or the second shaft is designed as a gearwheel. The first shaft is designed as a first gearwheel, and the second shaft is designed as a second gearwheel. The first gearwheel and the second gearwheel can each engage in a further gearwheel, as a result of which the seat belt can be tensioned by means of a corresponding tensioning mechanism. In particular, it is preferred if the gear ratio between the first gearwheel and the second gearwheel are unequal, wherein the gear ratio of the first gearwheel is preferably greater than the gear ratio of the second gearwheel. With such a dimensioned pairing of the gearwheels, the seat belt can be tensioned in a high gear until the switching moment is reached, during which time, when the torque to be transmitted is exceeded via the switching moment, the ejector clutch switches or changes into a low gear and a high torque can be achieved, whereby the seat belt can be tensioned particularly tightly.

According to a further embodiment of the present invention, the coupling part is drivingly coupled to a drive shaft. The drive shaft preferably connects the coupling part to an electric drive, the drive shaft specifying the axis of rotation of the coupling part.

In addition, it is also advantageous if the first shaft and/or the second shaft is rotatably supported on the drive shaft. Such an arrangement of the components of the ejector clutch enables a particularly simple and compact design.

A further aspect of the present invention relates to a belt tensioner with an ejector clutch according to the invention and a motor vehicle with at least one such belt tensioner.

BRIEF DESCRIPTION OF THE DRAWINGS

An inventive exemplary embodiment of the present invention is illustrated in detail below with reference to the accompanying drawings. The following is shown:

FIGS. 6A, 6B and 6C an exemplary embodiment of an ejector clutch with toothed edges applied to the first shaft and second shaft according to FIG. 1, in the non-coupled state. FIG. 6A is a side view; FIG. 6B is a plan view and FIG. 6C is a cross-sectional view;

FIGS. 7, 7B and 7C the exemplary embodiment from FIGS. 6A-6C in a state upon reaching the switching moment, similar to FIG. 2. FIG. 7A is a side view; FIG. 7B is a plan view and FIG. 7C is a cross-sectional view; and FIGS. 8A, 8B and 8C the ejector clutch from FIGS. 6A-6C in the coupled state, similar to FIG. 3. FIG. 8A is a side view; FIG. 8B is a plan view and FIG. 8C is a cross-sectional view.

In the following, identical or functionally identical components are identified with the same reference symbols. For the sake of clarity, not all identical or functionally identical parts are provided with a reference number in the individual figures.

Figure 1:
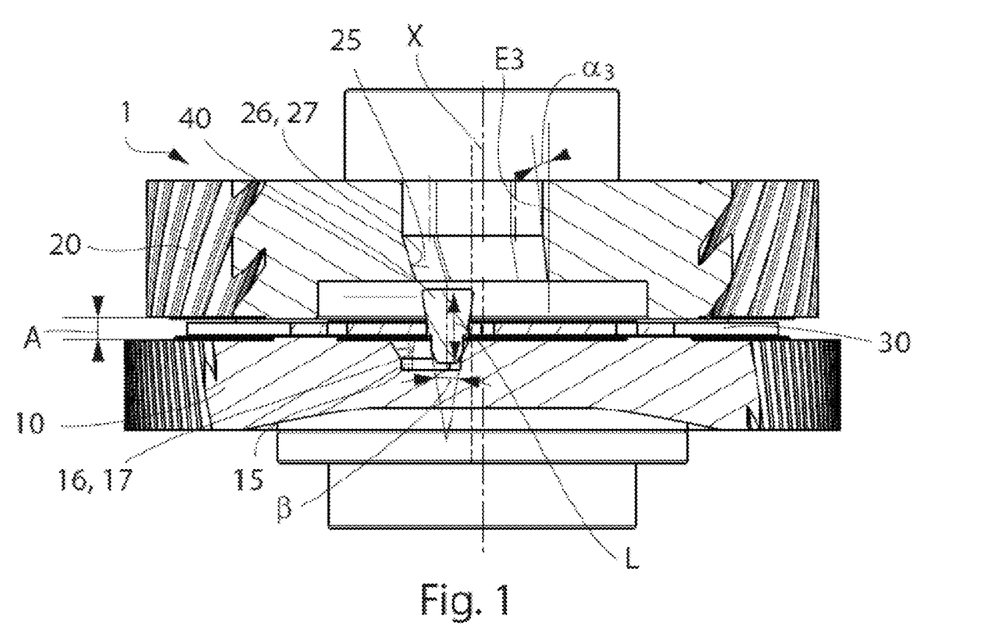
FIG. 1 a greatly simplified and partially sectioned view of the ejector clutch according to the invention, comprising a first shaft, a second shaft, and a coupling part disposed between the shafts, said coupling part transmitting a torque between the coupling part and the first shaft.

FIG. 1 shows an ejector clutch 1 according to the invention of a belt tensioner, having a first shaft 10, a second shaft 20, and a coupling part 30.

DETAILED DESCRIPTION

The first shaft 10, the second shaft 20, and the coupling part 30 are rotatably supported along a longitudinal axis X which defines an axial direction and are preferably aligned coaxially with respect to one another. The coupling part 30 is arranged between the first shaft 10 and the second shaft 20, the first shaft 10 and the second shaft 20 being arranged at a distance A from one another.

Figure 5:
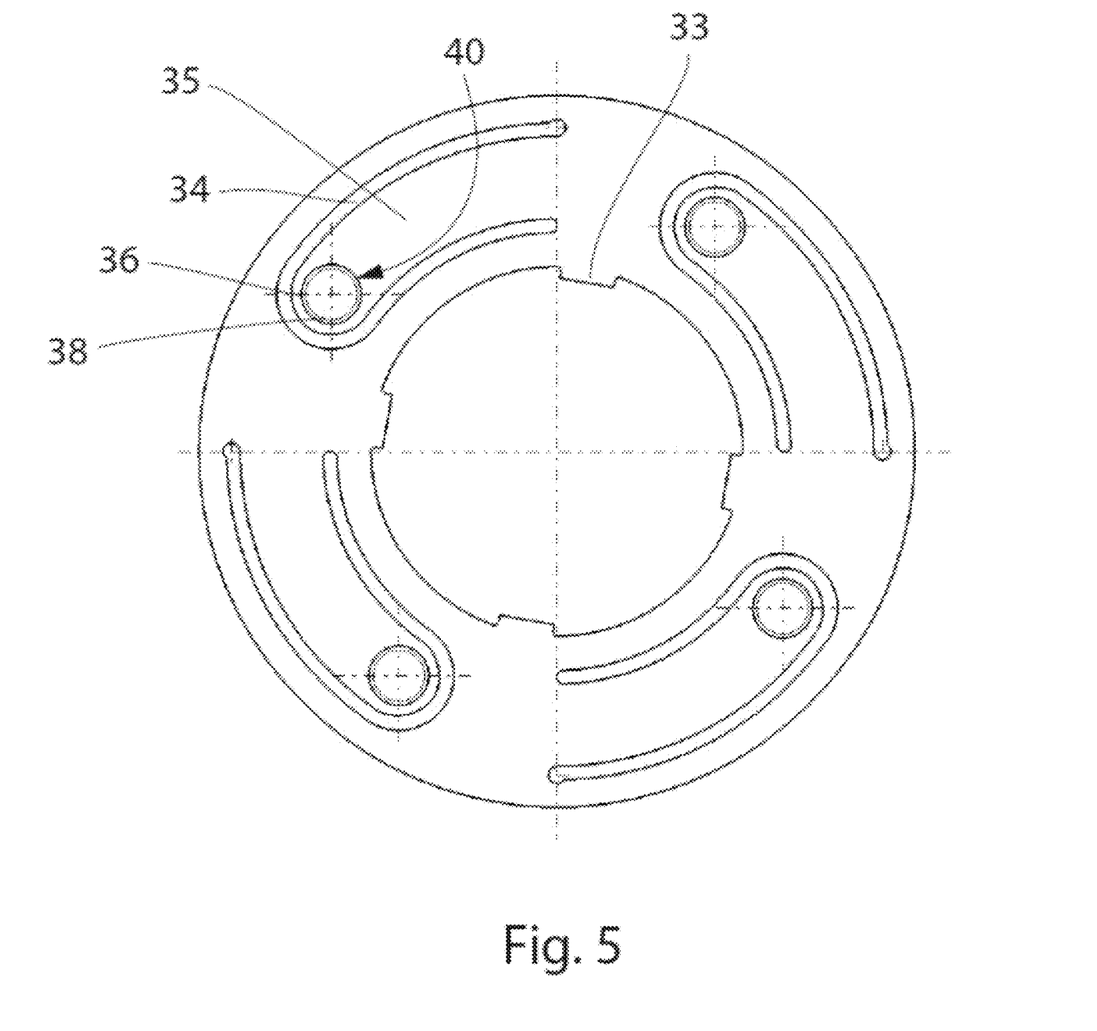
FIG. 5 a top view of the coupling part of the ejector clutch with four clutch fingers.

The coupling part 30 can be coupled to a drive shaft 60 (not shown) and driven by a drive by means of the drive shaft. The coupling part 30 can have one or more means 33 for forming a shaft-hub connection. For example, the means 33 can include cams which, as shown in FIG. 5, are designed to engage in the drive shaft 60 in the manner of a feather key.

The first shaft 10 and the second shaft 20 can be rotatably supported on the drive shaft and can further be connected to a tensioning mechanism (not shown) through which a seat belt (not shown) can be tensioned.

On the side facing the coupling part 30, the first shaft 10 has four symmetrically arranged first recesses 15 around the circumference about the longitudinal axis X. According to FIGS. 1-3, the respective first recess 15 is provided with two contact surfaces 16, which are designed in the manner of a wedge surface 17 in the axial direction such that the respective recess 15 tapers as the distance away from the coupling part 30 increases. The two contact surfaces 16 on the diametrical sides of the recess 15 can each be arranged in a first plane E1 and a second plane E2—see FIG. 2—the first plane E1 being arranged at an angle $\alpha 1$ to a plane in which the longitudinal axis X lies, and the second plane E2 being arranged at an angle $\alpha 2$.

In the exemplary embodiment shown, angles $\alpha 1$ and $\alpha 2$ are approximately 15°. However, angles $\alpha 1$ and $\alpha 2$ can also be in an angle range of $2.5° \leq \alpha \leq 85°$, the angle $\alpha$ preferably being in an angle range of $5° \leq \alpha \leq 60°$, and more preferably $15° \leq \alpha \leq 45°$.

The first recesses 15 can be incorporated or molded into the first shaft 10 on the side facing the coupling part 30 and can furthermore penetrate the first shaft 10 completely or partially in the axial direction.

Figure 2:
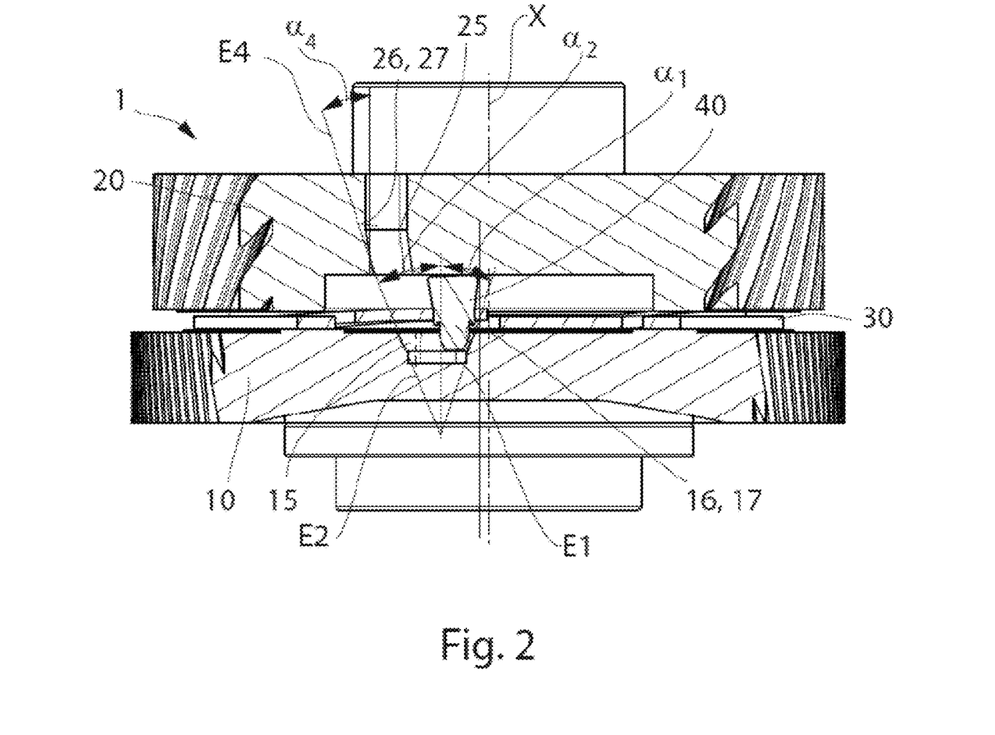
FIG. 2 a view of the ejector clutch according to FIG. 1 when the switching moment is reached.
Figure 3:
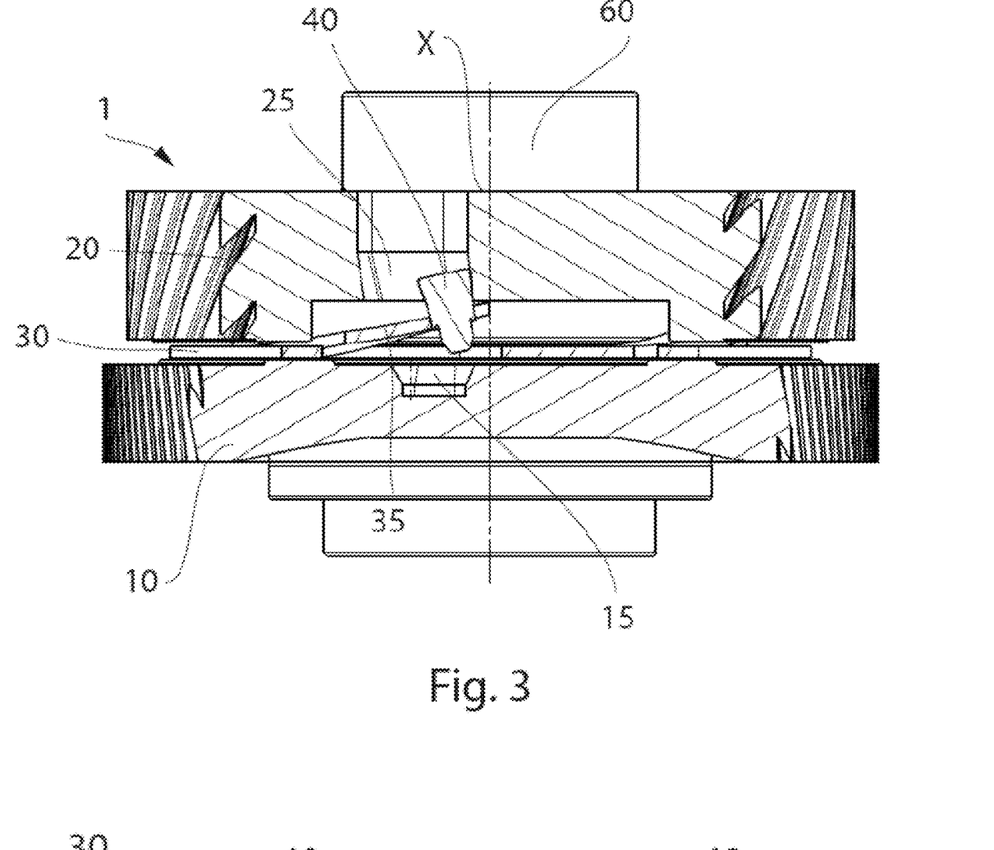
FIG. 3 a simplified and partially sectioned view of the ejector clutch according to FIGS. 1 and 2 during the transmitting of a torque between the coupling part and the second shaft.

The second shaft 20 is arranged on the side of the coupling part 30 opposite the first shaft 10 and likewise has four second recesses 25 arranged symmetrically around the circumference about the longitudinal axis X. As can be seen in FIGS. 1-3, the second recesses 25 are designed as passages in the second shaft 20 on the side facing the coupling part 30 and are provided with contact surfaces 26. The contact surfaces 26 are designed in the manner of a wedge surface 27 in the axial direction such that the second recess 25 tapers as the distance away from the coupling part 30 increases.

The two contact surfaces 26 on the diametrical sides of the second recess 25 can each be arranged in a third plane E3 and a fourth plane E4—see FIG. 2—the third plane E3 being arranged at an angle $\alpha 3$ to a plane which lies in the longitudinal axis X lies, and the fourth plane E2 being arranged at an angle $\alpha 4$.

As shown in FIGS. 1 and 2, the fourth angle $\alpha 4$ is greater than the third angle $\alpha 3$, angles $\alpha 3$ and $\alpha 4$ being in an angle range of $2.5° \leq \alpha \leq 85°$, more preferably the angle $\alpha$ lies in an angle range of $5° \leq \alpha \leq 60°$ and more preferably $15° \leq \alpha \leq 45°$. In the exemplary embodiment shown and illustrated, the third angle $\alpha 3$ is approximately 10° and the fourth angle $\alpha 4$ is approximately 15°, the contact surfaces 26 being designed such that the cross-section of the second recesses 25 increases as the distance away from the coupling part 30 increases.

Figure 4:
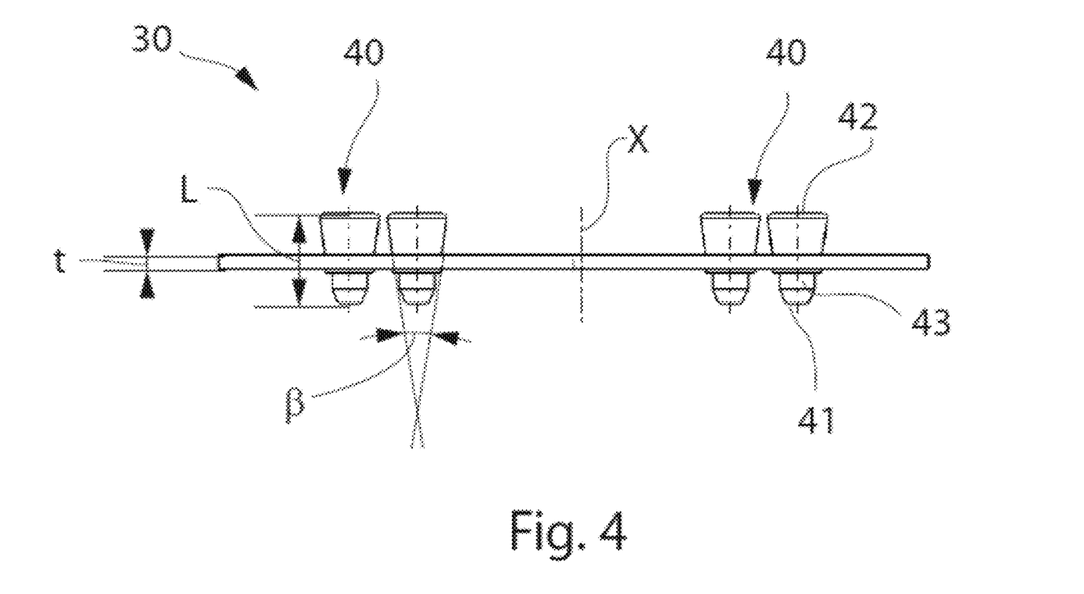
FIG. 4 a side view of the coupling part according to FIGS. 1 to 3.

The coupling part 30 is shown in detail in FIGS. 4 and 5 and comprises an annular base body, which is preferably made of spring steel. The coupling part 30 is also plate-shaped with a thickness t and has four clutch fingers 40 arranged around the circumference symmetrically about the longitudinal axis X.

The clutch fingers 40 are each inserted at a free end in an end region 36 of a spring bar 35 into an insertion opening 38 and can be attached there by means of flanging, pressing, and/or welding. The spring bar 35 connects the clutch finger to the base body of the coupling part 30, the base body and the spring bar 35 preferably being formed in one piece. The coupling part 30 can be manufactured as a stamped part.

The respective spring bar 35 is surrounded by a U-shaped groove 34, by means of which the spring bar 35 forms a partial section of a ring. At the end region of the U-shaped groove 34, expansions can be provided, by means of which the notch effect is reduced when the spring bar 35 moves in a spring manner.

In particular, FIG. 5 shows that the coupling part 30 has four spring bars 35. The clutch fingers 40 can be deflected together with the free end of the respective spring bar 35, the thickness t and the shape of the spring bars 35 largely determining a spring force against which the clutch fingers 40 can be deflected.

As shown in FIGS. 1-4, the clutch fingers 40 can be wedge-shaped or conical and have a first end region 41 and a second end region 42. As is shown, the first end region 41 is provided with a tip and the second end region 42 with a stump, the clutch finger 40 having an opening angle $\beta$, which is typically in a range of $5° \leq \beta \leq 90°$, more preferably $15° \leq \beta \leq 60°$. In the specific exemplary embodiment shown, the opening angle $\beta \approx$ is 20°.

The respective clutch finger 40 can have a transition region 43 between the first end region 41 and the second end region 42, said transition region being configured to establish a connection with the spring bar 35. The transition region 43 can comprise a shaft shoulder which is adapted to the insertion opening 38.

With reference to FIG. 4, it can be seen that the respective clutch finger 40 has a length L, the length L being a multiple of the thickness t. The following ratio preferably applies: $L \geq 3$ t, more preferably $L \geq 5$ t.

It is further preferred if the length L is greater than the distance A between the first shaft 10 and the second shaft 20.

With reference again to FIG. 1, it can be seen that the respective clutch finger 40 of the coupling part 30, more precisely the respective first end region 41 of the clutch finger 40, engages in a first recess 15 of the first shaft 10. In this state, the coupling part 30 can transmit a torque M to the first shaft 10, the torque M being transmitted by a form fit between the clutch fingers 40 and the first recesses 15 or the first contact surfaces 16 thereof.

As soon as a torque M is transmitted from the coupling part 30 to the first shaft 10, a force results in the axial direction, according to the principle of the inclined plane, between the first contact surface 16 and the wedge-shaped or conical clutch finger 40, by means of which the clutch finger 40 is pushed out of the first recess 15, against the spring force. The greater the torque M to be transmitted, the farther the spring bar 35 is deflected, together with the clutch finger 40, and pushed out of the first recess 15 in the direction of the second shaft 20.

In FIG. 2, the torque M to be transmitted reaches a predetermined value which corresponds to a switching moment $M_S$. As soon as the switching moment $M_S$ is reached, the clutch fingers 40 dip into the respective second recesses 25 of the second shaft 20 and henceforth a torque M is transmitted to the second shaft 20.

As soon as the clutch fingers 40—see FIG. 3—dip into the respective second recess 26, the second end region 42 comes into active contact with the second contact surfaces 26, wherein, according to the principle of the inclined plane, a further axial force is applied to the clutch finger 40, by means of which the clutch finger 40 is completely pulled out of the first recesses 15 of the first shaft 10, and the mechanical coupling between the coupling part 30 and the first shaft 10 is interrupted.

When the torque M to be transmitted decreases, the clutch finger 40 is pushed or moved back from the second recesses 25 in the direction of the first recesses 15 in the axial direction due to the spring force.

The first shaft 10 and/or the second shaft 20 can be made of a plastic or a metal. It is further preferred if the first shaft 10 and/or the second shaft 20 has a gearwheel or is a gearwheel. The gearwheels can each engage in a further gearwheel, as a result of which the seat belt can be tensioned by means of a corresponding tensioning mechanism. It is preferred if the first gearwheel of the first shaft 10 and the second gearwheel of the second shaft 20 form gearing with a gear ratio with the respective further gearwheel, the first shaft 10 having a larger gear ratio than the second shaft. For example, the seat belt can first be pre-tensioned in a high gear and the seat belt tightened sharply with a low gear and high torque when the switching moment is reached.

Figure 6A:
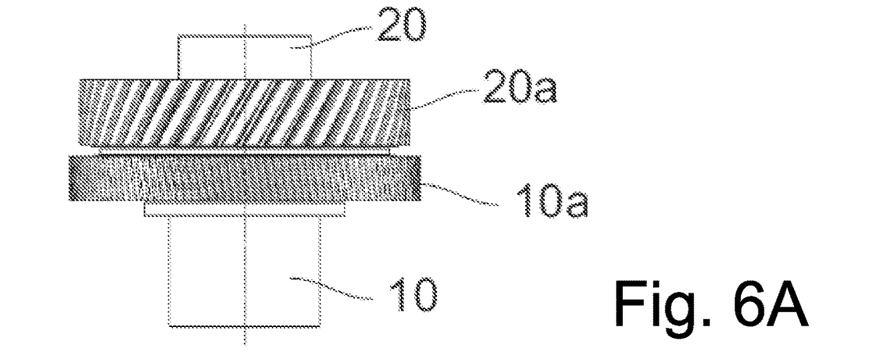
Figure 6B:
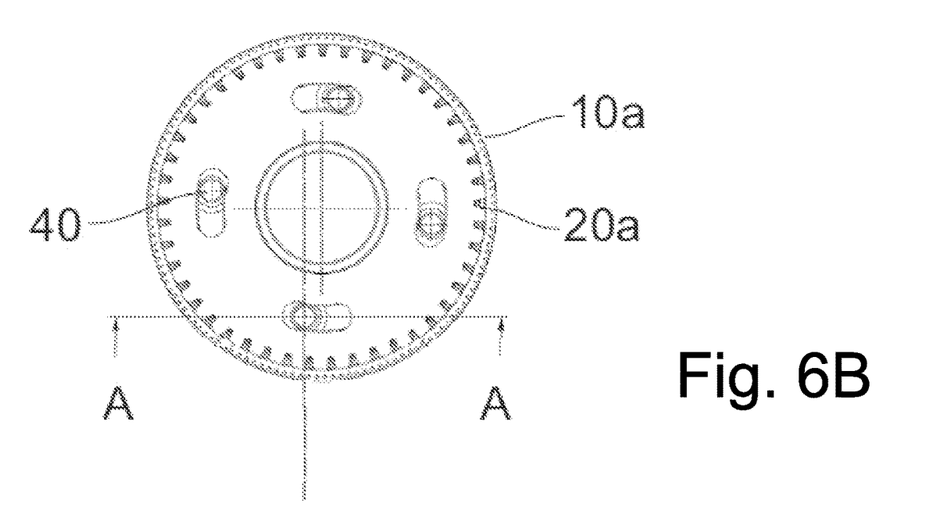
Figure 6C:
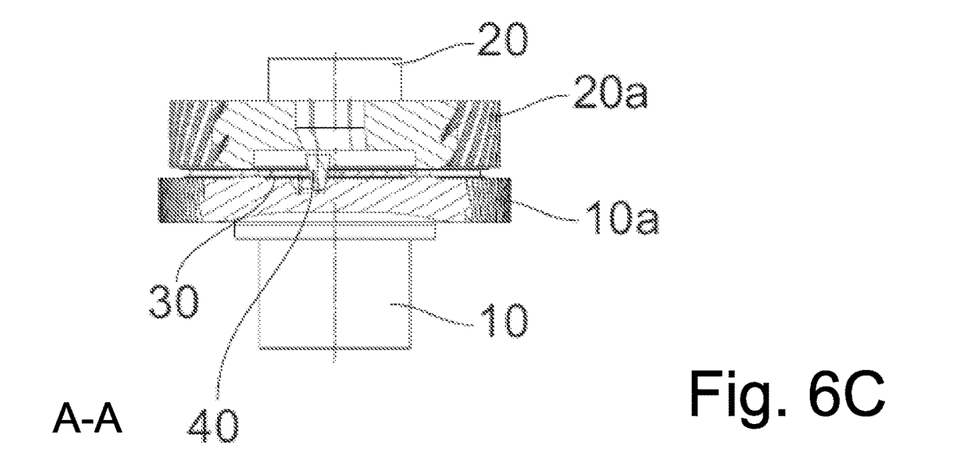
Figure 7A:
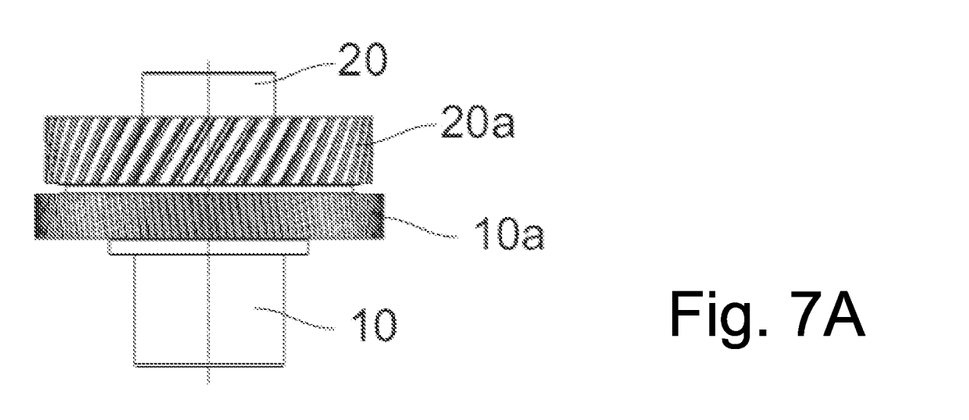
Figure 7B:
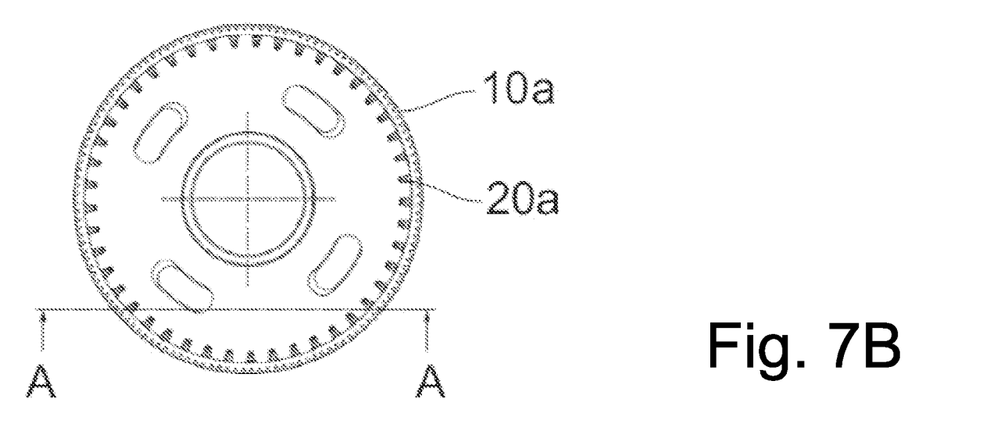
Figure 7C:
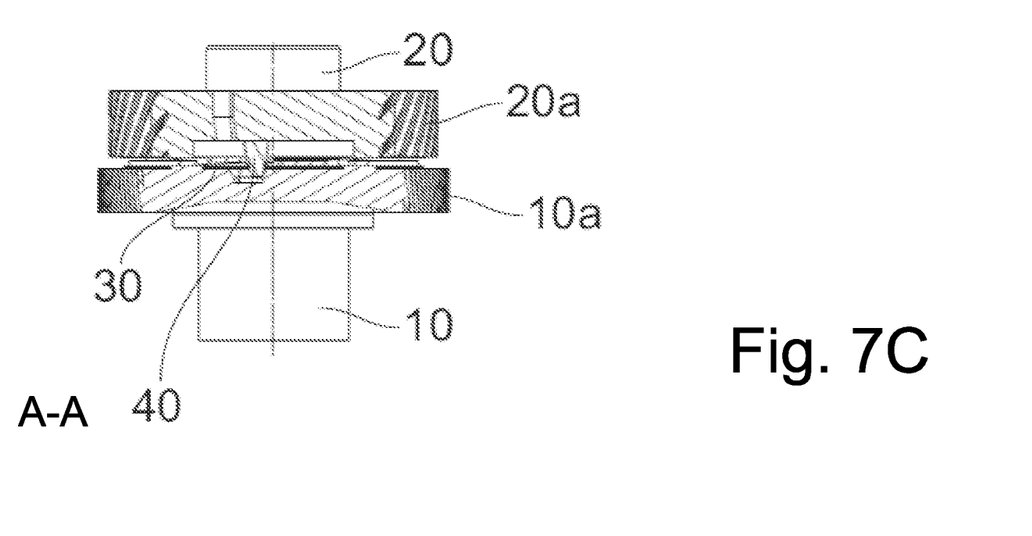
Figure 8A:
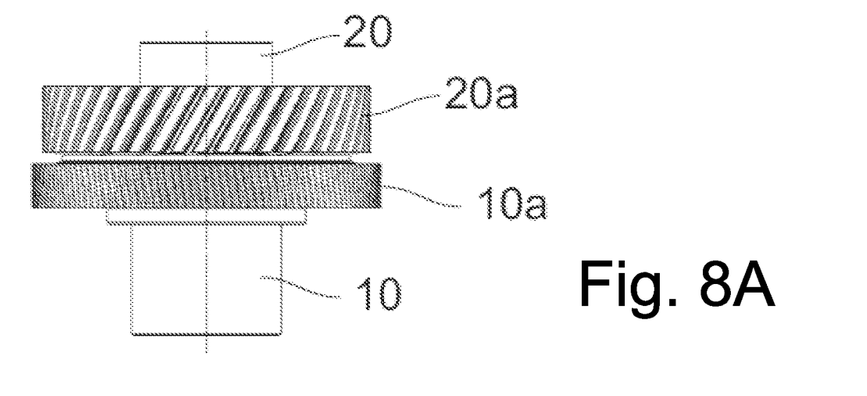
Figure 8B:
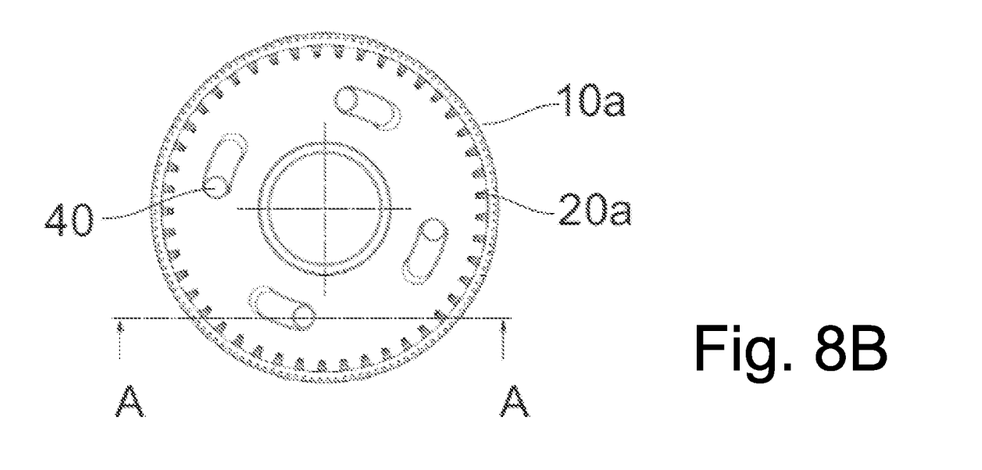
Figure 8C:
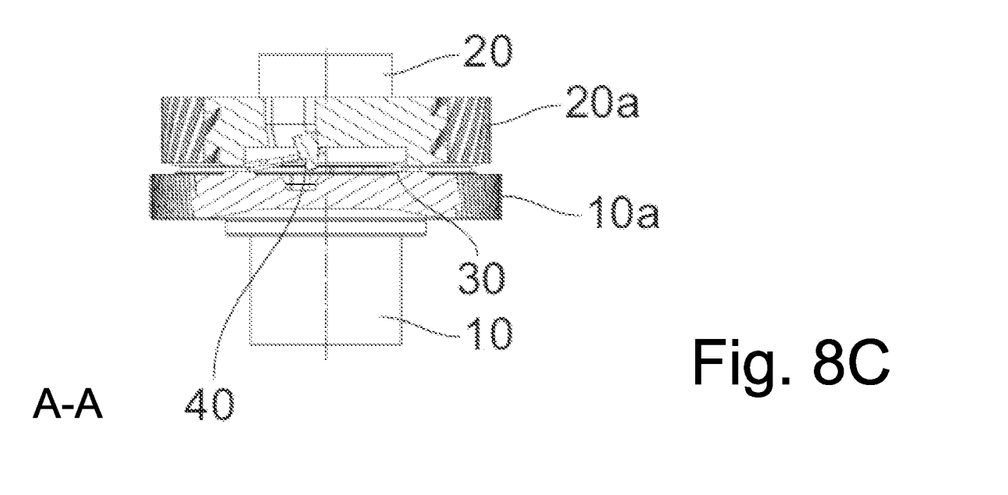

An arrangement in which gearwheels 10a and 20a are arranged on shafts 10 and 20, respectively, is shown in FIGS. 6 to 8. Specific exemplary embodiments of an ejector clutch according to FIGS. 1 to 3 are shown there. In addition, in contrast to the representations in FIGS. 1 to 3, a toothed edge 10a is applied to the first shaft 10 and a second toothed edge 20a is applied to the second shaft 20. The toothed edges 10a and 20a can be designed in one piece with shafts 10 and 20 or can be attached to shafts 10 and 20 as separate toothed rings. Shafts 10 and 20 with associated toothed edges 10a and 20a are coupled to one another in the aforementioned manner via the coupling part 30 and the clutch fingers 40 when a predetermined switching point is reached.

FIGS. 6 to 7 show shafts 10 and 20 to be coupled with toothed edges 10a and 20a at the top in a the top view, in the middle in a side view, and at the bottom in a partial sectional view. Similar to the basic illustration in FIG. 1, FIGS. 6A-6C show shafts 10 and 20 and thus toothed edges 10a and 20a in the non-coupled state—reaching the switching point for coupling is shown in FIGS. 7A-7C and the coupled state is shown in FIGS. 8A-8C. As can be seen from FIG. 8, the two gearwheels formed by toothed edges 10a and 20a are coupled to one another on shafts 10 and 20, such that, for example, a different toothed edge selection of toothed edge 20a compared to toothed edge 10a enables a greater gear ratio to be selected in a drive train. If the torque is reduced again, the coupling pins 40 can couple again into the first shaft 10, such that the greater gear ratio is canceled again.

LIST OF REFERENCE NUMERALS

1 Ejector clutch
10 First shaft
10a Toothed edge on 10
15 First recess
16 Contact surface
17 Wedge surface
20 Second shaft
20a Toothed edge on 20
25 Second recess
26 Contact surface
27 Wedge surface
30 Coupling part
33 Means
35 Spring bar
36 End region
38 Insertion opening
40 Clutch finger
41 First end region
42 Second end region
43 Transition region
60 Drive shaft
E Plane
A Distance
L Length
T Thickness
M Torque
X Longitudinal axis
A Angle
β Angle

What is claimed is:

1. An ejector clutch (1), comprising:
a first shaft (10), a second shaft (20), and a coupling part (30), the coupling part (30) arranged between the first shaft (10) and the second shaft (20) in a longitudinal axis (X) defining an axial direction, and the coupling part (30) operatively coupled to a drive shaft,
wherein the coupling part (30) has at least one clutch finger (40), which engages in a first recess (15) of the first shaft (10) for transmitting a torque (M) and, when a torque (M2) to be transmitted is exceeded by a predetermined value, said clutch finger is displaced, against a spring force in the axial direction, from the first recess (15) of the first shaft (10) into a second recess (25) of the second shaft (20) and as the torque (M2) to be transmitted again falls below the predetermined value, the clutch finger (40) is moved, by the spring force, from the second recess (25) back into the first recess (15) of the first shaft (10).

2. The ejector clutch (1) according to claim 1, characterized in that
the at least one clutch finger (40) is connected to the coupling part (30) by a spring bar (35).

3. The ejector clutch (1) according to claim 2, characterized in that
the spring bar (35) is arcuate and has a free end region (36) on which the clutch finger (40) is arranged.

4. The ejector clutch (1) according to claim 1, characterized in that
the clutch finger (40) is arranged a distance away from the longitudinal axis (X) and has a first end region (41) and a second end region (42), in that the first end region (41) protrudes from the coupling part (30), in the longitudinal axis (X), on the side facing the first shaft (10), and in that the second end region (42) protrudes from the coupling part (30), in the longitudinal axis (X), on the side facing the second shaft (20).

5. The ejector clutch (1) according to claim 1, characterized in that
a distance (A) between the first shaft (10) and the second shaft (20) is less than a length (L) of the clutch finger (40).

6. The ejector clutch (1) according to claim 1, characterized in that
the clutch finger (40) is wedge-shaped or conical.

7. The ejector clutch (1) according to claim 1, characterized in that
the first recess (15) and/or the second recess (25) has at least one contact surface (16, 26), wherein the contact surface (16, 26) is designed to apply a force, directed in the axial direction, to the clutch finger (40) when a torque (M) is transmitted.

8. The ejector clutch (1) according to claim 7, characterized in that
the at least one contact surface (16, 26) is designed as a wedge surface (17, 27) tapering in the axial direction.

9. The ejector clutch (1) according to claim 7, characterized in that
the at least one contact surface (16, 26) lies in a plane (E) which is inclined at an angle (a) to a plane in which the longitudinal axis (X) lies.

10. The ejector clutch (1) according claim 1, characterized in that
the coupling part (30) has multiple clutch fingers (40) about the longitudinal axis (X), arranged circumferentially-symmetrically about the longitudinal axis (X).

11. The ejector clutch (1) according to claim 1, characterized in that
the first shaft (10) and the second shaft (20) have multiple recesses (15, 25), which arranged circumferentially-symmetrically about the longitudinal axis (X).

12. The ejector clutch (1) according to claim 1, characterized in that
the first shaft (10) and/or the second shaft (20) has a gearwheel.

13. The ejector clutch (1) according to claim 1, characterized in that
the first shaft (10) and/or the second shaft (20) is rotatably supported on the drive shaft (60).

14. The ejector clutch (1) according to claim 1, connectable to a seat belt tensioner to provide a pretensioning function, and characterized in that
the first shaft (10) supports a first gearwheel (10a) and the second shaft (20) supports a second gearwheel (20a), and the first and second garwheels (10a, 20a) form gearing with a gear ratio such that the first gearwheel (10a) has a larger gear ratio than the second gearwheel (20a),
wherein a seat belt can first be pre-tensioned in a high gear and the seat belt tightened sharply with a low gear to achieve a high torque when reaching a predetermined switching moment corresponding to the torque (M2) to be transmitted being exceeded by the redetermined value.

15. An ejector clutch (1) of a belt tensioner, comprising:
a first shaft (10), a second shaft (20), and a coupling part (30), the coupling part (30) arranged between the first shaft (10) and the second shaft (20) in a longitudinal axis (X) defining an axial direction, and the coupling part (30) operatively coupled to a drive shaft; and
the first shaft (10) supporting a first gearwheel (10a) and the second shaft (20) supporting a second gearwheel (20a), and the first and second gearwheels (10a, 20a) form gearing with a gear ratio such that the first gearwheel (10a) has a larger gear ratio than the second gearwheel (20a),
wherein the coupling part (30) has at least one clutch finger (40), which engages in a first recess (15) of the first shaft (10) for transmitting a torque (M) and, when a torque (M2) to be transmitted is exceeded by a predetermined value, said clutch finger is displaced, against a spring force in the axial direction, from the first recess (15) of the first shaft (10) into a second recess (25) of the second shaft (20) and as the torque (M2) to be transmitted again fails below the predetermined value, the clutch finger (40) is moved, by the spring force, from the second recess (25) back into the first recess (15) of the first shaft (10).

16. The ejector clutch (1) according to claim 15, characterized in that
the at least one clutch finger (40) is connected to the coupling part (30) by a spring bar (35); and
the spring bar (35) is arcuate and has a free end region (36) on which the clutch finger (40) is arranged.

17. The ejector clutch (1) according to claim 15, characterized in that
the clutch finger (40) is arranged a distance away from the longitudinal axis (X) and has a first end region (41) and a second end region (42), in that the first end region (41) protrudes from the coupling part (30), in the longitudinal axis (X), on the side facing the first shaft (10), and in that the second end region (42) protrudes from the coupling part (30), in the longitudinal axis (X), on the side facing the second shaft (20); and
a distance (A) between the first shaft (10) and the second shaft (20) is less than a length (L) of the clutch finger (40).

18. The ejector clutch (1) according to claim 15, characterized in that:
the first recess (15) and/or the second recess (25) has at least one contact surface (16, 26), wherein the contact surface (16, 26) is designed to apply a force, directed in the axial direction, to the clutch finger (40) when a torque (M) is transmitted; and
the at least one contact surface (16, 26) is designed as a wedge surface (17, 27) tapering in the axial direction.

19. The ejector clutch (1) according to claim 15, characterized in that:
the first recess (15) and/or the second recess (25) has at least one contact surface (16, 26), wherein the contact surface (16, 26) is designed to apply a force, directed in the axial direction, to the clutch finger (40) when a torque (M) is transmitted; and
the at least one contact surface (16, 26) lies in a plane (E) which is inclined at an angle (a) to a plane in which the longitudinal axis (X) lies.

20. The ejector clutch (1) according claim 15, characterized in that
the coupling part (30) has multiple clutch fingers (40) about the longitudinal axis (X), arranged circumferentially-symmetrically about the longitudinal axis (X); and the first shaft (10) and the second shaft (20) have multiple recesses (15, 25), arranged circumferentially-symmetrically about the longitudinal axis (X).

* * * * *